US009654560B2

(12) United States Patent
Tanaka et al.

(10) Patent No.: US 9,654,560 B2
(45) Date of Patent: May 16, 2017

(54) MANAGEMENT SYSTEM AND METHOD

(71) Applicant: Hitachi, Ltd., Tokyo (JP)

(72) Inventors: Toru Tanaka, Tokyo (JP); Atsumi Terayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 355 days.

(21) Appl. No.: 14/377,367

(22) PCT Filed: Nov. 6, 2013

(86) PCT No.: PCT/JP2013/079981
§ 371 (c)(1),
(2) Date: Aug. 7, 2014

(87) PCT Pub. No.: WO2015/068217
PCT Pub. Date: May 14, 2015

(65) Prior Publication Data
US 2016/0248882 A1    Aug. 25, 2016

(51) Int. Cl.
*G06F 15/16* (2006.01)
*H04L 29/08* (2006.01)
*H04L 12/24* (2006.01)
*G06F 12/00* (2006.01)

(52) U.S. Cl.
CPC ...... *H04L 67/1097* (2013.01); *H04L 41/0213* (2013.01); *H04L 67/025* (2013.01)

(58) Field of Classification Search
CPC ... H04L 67/1097; H04L 49/357; H04L 49/70; H04L 49/45; H04L 49/602; H04L 12/4641; H04L 49/3045; H04L 47/6205; H04L 49/90; H04L 49/901; H04L 49/9094; H04L 47/6215; H04L 47/70; H04L 63/20; H04L 69/08; H04L 49/356; H04L 12/04
USPC ................................ 709/223–229, 203, 250
See application file for complete search history.

(56) References Cited

U.S. PATENT DOCUMENTS

| 5,325,517 | A | 6/1994 | Baker et al. |
| 6,163,796 | A | 12/2000 | Yokomizo |
| 2005/0091346 | A1* | 4/2005 | Krishnaswami .... G06F 9/44505 709/220 |
| 2007/0192863 | A1* | 8/2007 | Kapoor .................. G06F 9/505 726/23 |
| 2009/0094428 | A1 | 4/2009 | Nagata et al. |

(Continued)

FOREIGN PATENT DOCUMENTS

| JP | 03-006742 A | 1/1991 |
| JP | 07-064893 A | 3/1995 |

(Continued)

*Primary Examiner* — Zarni Maung
(74) *Attorney, Agent, or Firm* — Volpe and Koenig, P.C.

(57) ABSTRACT

A management system receives a first process request for a first application program (APP), and specifies a second APP that is related to the first APP as a target APP of the first process request and is in an APP environment different from an APP environment of the first APP. The management system generates a second process request for executing, on the second APP, a process that is the same as a process according to the first process request, based on the first process request and on conversion information indicating a relationship between a process request before a conversion and a process request after the conversion.

7 Claims, 13 Drawing Sheets

(56) References Cited

U.S. PATENT DOCUMENTS

2012/0180030 A1\* 7/2012 Crutchfield ............. G06F 8/443
  717/149
2013/0061230 A1\* 3/2013 Papakipos ............. G06F 9/5027
  718/102

FOREIGN PATENT DOCUMENTS

| JP | 2002-312311 A | 10/2002 |
| JP | 2012-212462 A | 11/2012 |

\* cited by examiner

| 6001 | 6002 | 6003 | 6004 2003 |
|---|---|---|---|
| COMPUTER | IP_ADDRESS | APPLICATION | VOL |
| 1000A | 192.168.1.101 | APP1 | 606A |
| 1000B | 192.168.1.102 | APP1 | 606B |
| 1000C | 192.168.1.103 | APP2 | 606C |
| 1000D | 192.168.1.104 | APP2 | 606D |

Fig. 6

| 7001 | 7002 | 7003 | 7004 2004 |
|---|---|---|---|
| COMPUTER | VOL | TARGET | LU |
| 1000A | 606A | 1401 | 1431 |
| 1000B | 606B | 1401 | 1432 |
| 1000C | 606C | 1401 | 1433 |
| 1000D | 606D | 1401 | 1434 |

Fig. 7

| 10001 | 10002 | 10003 | 10004 3006 |
|---|---|---|---|
| COMPUTER | REQUEST | NO | OPERATE |
| 1100D | Clone | 1 | Create machine |
| 1100D | Clone | 2 | Local Copy(Primary, Secondary) |
| 1100D | FastClone | 1 | Create machine |
| 1100D | FastClone | 2 | CoW(Primary, Secondary) |
| 1100D | Backup | 1 | Local Copy(Primary, Secondary) |
| : | : | : | : |

Fig. 10

| 11001 | 11002 | 11003 3007 |
|---|---|---|
| SYSTEM | COMPUTER | APP |
| 100 | 1000A | 2001A |
| 100 | 1000C | 2001C |
| : | : | : |

Fig. 11

| 12001 | 12002 | 12003 | 12004 4003 |
|---|---|---|---|
| STORAGE | LU | SIZE | I/F |
| 1400 | 1431 | 100GB | 1401 |
| 1400 | 1432 | 100GB | 1401 |
| 1400 | 1433 | 100GB | 1401 |
| 1400 | 1434 | 100GB | 1401 |
| : | : | : | : |

Fig. 12

MANAGEMENT SYSTEM AND METHOD

TECHNICAL FIELD

The present invention generally relates to support of application management.

BACKGROUND ART

A plurality of application programs (hereinafter, referred to as APP) can run on a physical computer. Management programs for managing APPS have been prepared. Vendors of APPS (ISV (Independent Software Vendor) for example) provide a cooperative module for the management program. The cooperative module is a program generally referred to as "plug-in" or "adapter" with a function of converting an operation for an APP into an operation for a platform, and other functions. Here, "platform" refers to one or more components required for running the APP, and may be, for example, a logical volume storing an image of the APP, a storage apparatus providing the logical volume, and the like. For example, PTL 1 is known as a technique related to the management of an object (for example, a table) and the logical volume.

CITATION LIST

Patent Literature

[PTL 1]
US2009/0094428

SUMMARY OF INVENTION

Technical Problem

In many cases, a system environment including an APP does not include a single APP but includes a plurality of APPs. Here, "system environment" is an environment including an APP and a platform used by the APP. For example, the system environment may include, in addition to a first APP and a logical volume used by the first APP, a second APP related to the first APP and a logical volume used by the second APP. A manager trying to execute an operation such as cloning in a unit of a system is not aware of the relationship between the APPs. Thus, the manager cannot figure out which APP and which platform should be cloned. When the manager executes the cloning in a unit of a system including a certain APP, the manager is not aware of the APP environment of another APP related to the certain APP. Here, "APP environment" is an environment related to the execution of the APP (for example, execution of a job of the APP), and includes an operation order, a condition for executing the operation, an approval route, and the like, for example. The manager needs to inquire another manager to know about the APP environment of the other APP. The operation management cost for the APP is high duet to these problems.

An object of the present invention is to reduce the operation management cost for an APP.

Solution to Problem

A management system receives a first process request for a first application program (APP), and specifies a second APP that is related to the first APP as a target APP of the first process request and is in an APP environment different from an APP environment of the first APP. The management system generates a second process request for executing, on the second APP, a process that is the same as a process according to the first process request, based on the first process request and on conversion information indicating a relationship between a process request before a conversion and a process request after the conversion.

Advantageous Effects of Invention

The operation management cost for an APP can be reduced.

BRIEF DESCRIPTION OF DRAWINGS

FIG. 6 shows the structure of an APP table.
FIG. 7 shows the structure of a computer management table.
FIG. 10 shows the structure of an integrated management table.
FIG. 11 shows the structure of a system management table.
FIG. 12 shows the structure of a storage management table.

DESCRIPTION OF EMBODIMENTS

Figure 1:
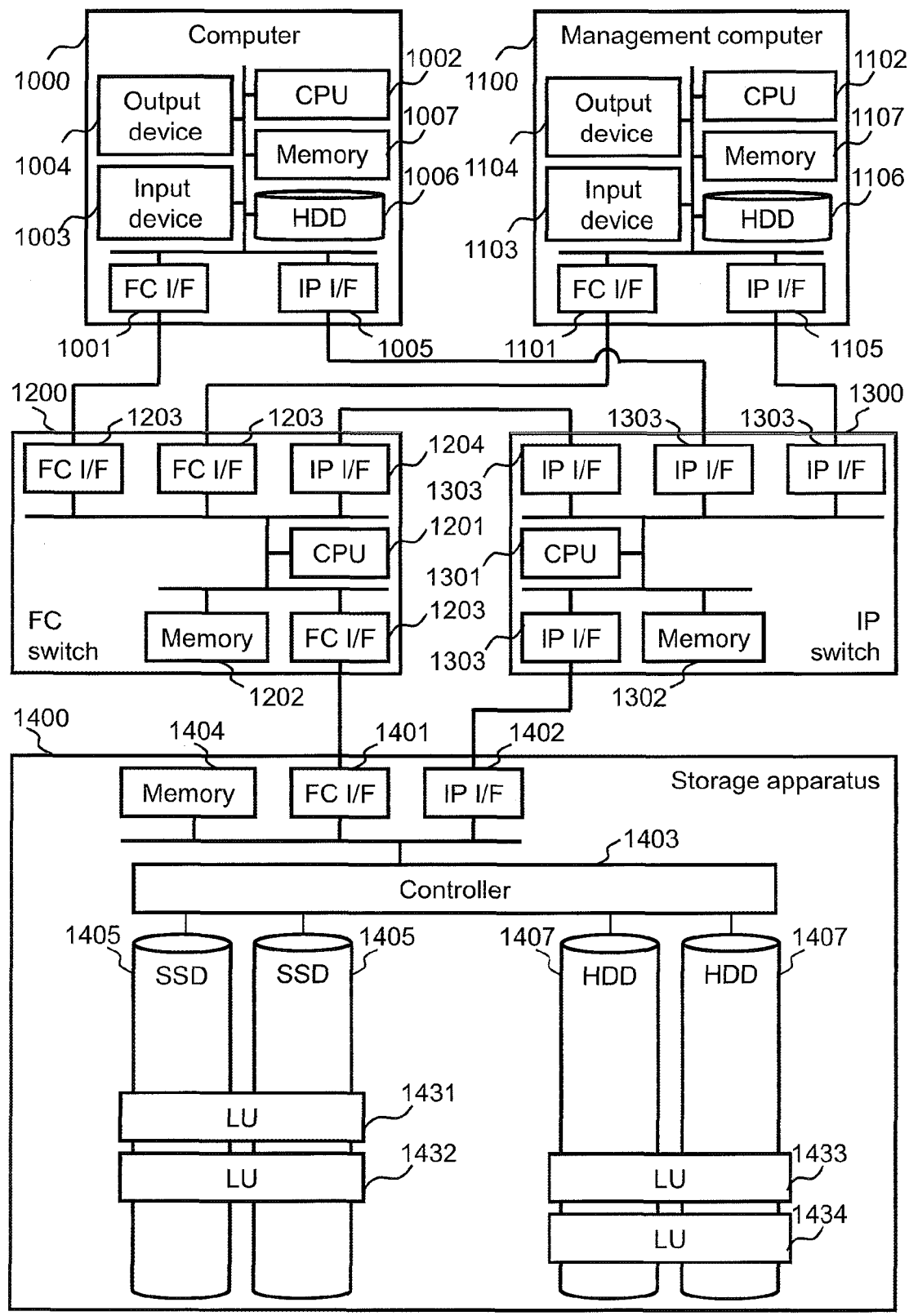
FIG. 1 shows a system configuration according to an embodiment.

In the following description, information is sometimes described with an expression "xxx table". However, the information may be expressed with any data structure. Specifically, "xxx table" may be referred to as "xxx information" to show that the information does not depend on the data structure.

In the following description, processes are sometimes described with "program" as a subject. The program is executed by a processor (a CPU (Central Processing Unit), for example) to execute a predetermined process by using a storage device (a memory, for example) and/or a communication interface device (a communication port, for example) as appropriate. Thus, the processor may be the subject of the process. Furthermore, the process, described with the program as a subject, may be a process executed by a processor, or a computer, a management computer, or a storage apparatus including the processor. The processor may be the CPU itself, or may include a hardware circuit that execute a part of or all the processes executed by the processor. The program may be installed in each controller from a program source. The program source may be a program distribution server or a storage medium, for example.

In the following description, a number, an identifier, or a name is used as identification information of various components (a computer and an APP, for example). Alternatively or in addition, other types of identification information may be used.

A management computer system may include at least one computer. Specifically, for example, when the management computer displays information (specifically, when the management computer displays information on the own display device, or the management computer transmits display information to a remote display computer), the management computer is the management computer system. For example, when a plurality of computers implement functions equivalent to those of the management computer, the plurality of computers (that may include a display computer when the display computer executes the display) are the management computer system. The management computer system may be a combination of the management computer and the display computer. In the embodiment described below, the management computer is the management computer system.

A management system may be a system including all or a part of the management computer system. For example, the management system may be a management computer 1100D including an integrated management program 3003 described later. The integrated management program 3003 may not be provided. In this case, at least one of a plurality of processors (a plurality of management computers 1100) that execute a plurality of cooperative management programs 3002 in different APP environments may be the management system.

In the following description, the reference numerals of components of the same type include a common main number. In the following description, in some cases, the reference numeral is used when the components of the same type are described while being distinguished from each other, and only the common main number of the reference numerals is used, when the components are described while not being distinguished from each other. For example, in FIG. 5, the computers are referred to as computer 1000A and a computer 1000B to be distinguished from each other, and referred to as computer 1000 when the computers are not distinguished from each other. The description of the computer 1000 covers the description of each computer.

An embodiment is described below. First, an overview of the embodiment is described by referring to FIG. 5.

A management computer 1100A, which manages an APP1 2001A, cooperates with a management computer 1100B, which manages an APP2 2001C, to manage a computer (server) 1000 and a storage apparatus 1400. A management program 3001 is in an APP environment. The management program 3001 is a program for executing an operation such as cloning of the APP 2001 and a platform thereof (for example, the computer 1000, on which the APP 2001 runs, and an LU (Logical Unit) used by the APP 2001). Platform vendors are developing a cooperative function (cooperative management program) 3002, generally referred to as a plug-in and an adapter, to adapt the operation of the management program 3001 to the platform provided by the vendor. Thus, the physical or the logical resource (LU, for example) of the computer (server) 1000 and the storage apparatus 1400 can be cloned in conjunction with an operation such as cloning issued by the management program 3001. However, the system environment does not include a single APP but includes a plurality of APPs. Thus, the manager of an APP1 environment trying to execute an operation, such as cloning of the APP1 in a unit of a system, is not aware of whether another APP related to the APP1 exists, or is aware that the other APP related to the APP1 exists but does not know whether the other APP is the APP2. Thus, the manager cannot figure out which APP and which platform should be cloned. When executing the cloning in a unit of a system including the APP1, the manager of the APP1 environment does not know the operation order, the condition for executing the operation, and the arrival route in an APP environment of the other APP2 related to the APP1, and thus has to inquire the information from the manager of an APP2 environment. The operation management cost is high due to these problems. To solve the problems, the integrated management program 303 has been prepared. The integrated management program 303 includes a group of management tables (at least one table) for managing a relationship among an APP operation request, a common operation request, a platform operation request, an instruction defined in each request, and the like. The integrated management program 3003 acquires a table (for example, an APP table 2003 and the like) of a management target apparatus (for example, a computer and a storage apparatus) from the management target apparatus. The integrated management program 3003 specifies a same system APP (an APP related to the target APP) as an APP in the same system as the target APP, based on the acquired table and the group of management tables. Thus, the integrated management program 3003 executes a platform operation not only for the target APP but also for the same system APP. All things considered, the manager no longer needs to make the inquiry to figure out the same system APP. As a result, the operation management cost can be reduced.

Embodiments are described in detail below.

FIG. 1 shows a system configuration according to an embodiment.

The computer 1000 is coupled to the storage apparatus 1400, and the management computer 1100 is coupled to the computer 1000 and the storage apparatus 1400. The computer 1000 is coupled to the storage apparatus 1400 through an FC (Fibre Channel) switch 1200 for example. The management computer 1100 is coupled to the computer 1000 and the storage apparatus 1400 through an IP (Internet Protocol) switch 1300, for example. The computer 1000 and the management computer 1100 each include communication interface devices (communication I/F) to communicate with an external apparatus, storage devices, an input device, an output device, and a processor coupled to the components. At least one of the input device and the output device may be provided in a remote apparatus.

The computer 1000 is a computer that performs an input and output to and from the storage apparatus 1400. The communication I/Fs of the computer 1000 is an FC I/F 1001 that transmits and receives input-output data to and from the storage apparatus 1400, and an IP I/F 1005 that transmits and receives management data to and from the management computer 1100, for example. In the present embodiment, data to be stored in an LU is referred to as "input-output data", and a request transmitted to and from the management computer 1100 and data transmitted and received to and from the management computer 1100 in response to the request are collectively referred to as "management data".

The processor of the computer 1000 is a CPU 1002 that executes a program and controls the computer as a whole, for example. The storage devices of the computer 1000 is a memory 1007 as a main storage for storing programs and data and an HDD (Hard Disk Drive) 1006 as a secondary storage for storing programs and user data. Another type of the physical storage device such as an SSD (Solid State Device) may be used instead of the HDD. An input device of the computer 1000 is an input device 1003 such as a keyboard and a mouse, to which information is input from a user, for example. The output device of the computer 1000 is an output device 1004 such as a display for displaying information to the user, for example. In the present embodiment, a plurality of the computers 1000 exist.

The management computer 1100 is a computer that manages the computer 1000 and the storage apparatus 1400. The communication I/Fs of the computer 1100 is an FC I/F 1101 that transmits and receives the input-output data to and from the storage apparatus 1400, and an IP I/F 1105 that transmits and receives the management data to and from the computer 1000 and the storage apparatus 1400. Here, "control data" may be a command to a controller 1403. The input-output data and the control data are stored in a predetermined LU (not shown) of the storage apparatus 1400. The controller 1403 may execute a process in accordance with the control data in the predetermined LU. The processor of the management computer 1100 is a CPU 1102 that executes a program and controls the management computer as a whole. The storage device of the management computer 1100 is a memory 1107 as a primary memory for storing programs and data and an HDD 1106 as a secondary storage for storing programs and user data. Another type of the physical storage device such as an SSD may be used instead of the HDD. An input device of the computer 1100 is an input device 1103 such as a keyboard and a mouse, to which information is input from a user. The output device of the computer 1100 is an output device 1104 such as a display for displaying information to the user. In the present embodiment, a plurality of the management computers 1100 exist.

The FC switch 1200 is a switch device for transferring the input-output data from the management computer 1000 to the storage apparatus 1400. The FC switch 1200 includes an FC I/F 1203 that transmits and receives the input-output data, an IP I/F 1204 that transmits and receives the management data, a CPU 1201 that executes a program and controls the FC switch as a whole, and a memory 1202 as a storage area for programs and data.

The IP switch 1300 is a switch apparatus for transferring the management data from the management computer 1100 to the computer 1000 and the like. The IP switch 1300 includes an IP I/F 1303 that transmits and receives the management data, a CPU 1301 that executes a program and controls the IP switch as a whole, and a memory 1302 as a storage area for programs and data.

The storage apparatus 1400 is anode that processes the input-output data from the computer 1000. The storage apparatus 1400 can be roughly divided into a control unit and a storage unit. The control unit includes communication I/Fs, a memory, and a processor coupled to the components. The communication I/Fs are an FC I/F 1401 that transmits and receives the input-output data to and from the computer 1000 through the FC switch 1200 and an IP I/F 1402 that transmits and receives the management data to and from the management computer 1100 through the IP switch 1300, for example. The processor is, for example, the controller 1403 including a CPU that executes a program and controls the storage apparatus as a whole. The memory is, for example, a memory 1404 as a storage area for a program. The storage unit includes, for example, an SSD 1405 and an HDD 1407, in which user data is stored. The storage unit may include a RAID (Redundant Arrays of Independent (Inexpensive) Disks) group. The RAID group may include physical storage devices of the same type. For example, a group of SSDs as a RAID group including a plurality of SSDs 1405 and a group of HDDs as a RAID group including a plurality of HDDs 1407 may be provided. LUs (Logical Units) 1431 and 1432 may be formed based on the group of SSDs, and LUs 1433 and 1434 may be formed based on the group of HDDs.

Figure 2:
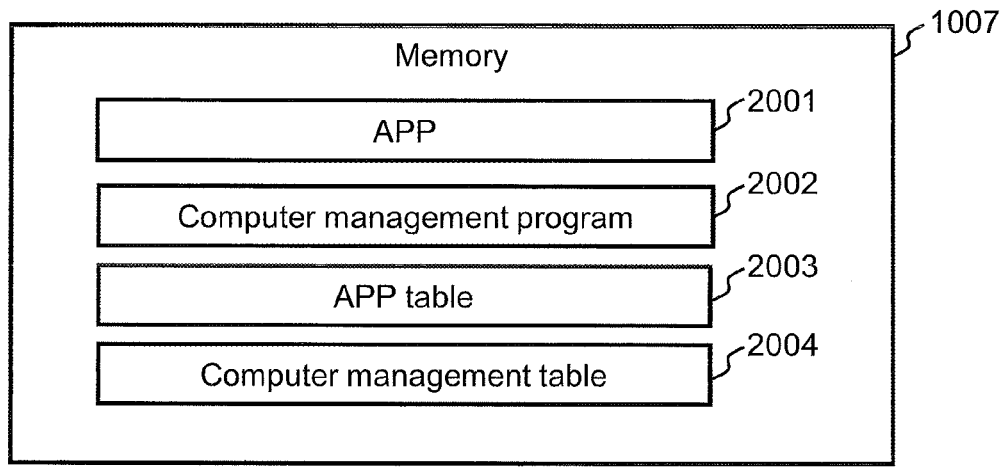
FIG. 2 shows a program and tables stored in a memory of a computer.

FIG. 2 shows a program and tables stored in the memory 1007 of the computer 1000.

The memory 1007 stores the APP (application program) 2001 that provides an APP environment for the user of the computer 1000, an APP table 2002 that manages configuration information of the APP, and a computer management table 2003 including information indicating a structure related to the computer. The program and the tables may be read from the HDD 1006 onto the memory 1007 by the CPU 1002 when the computer 1000 is booted, for example.

Figure 3:
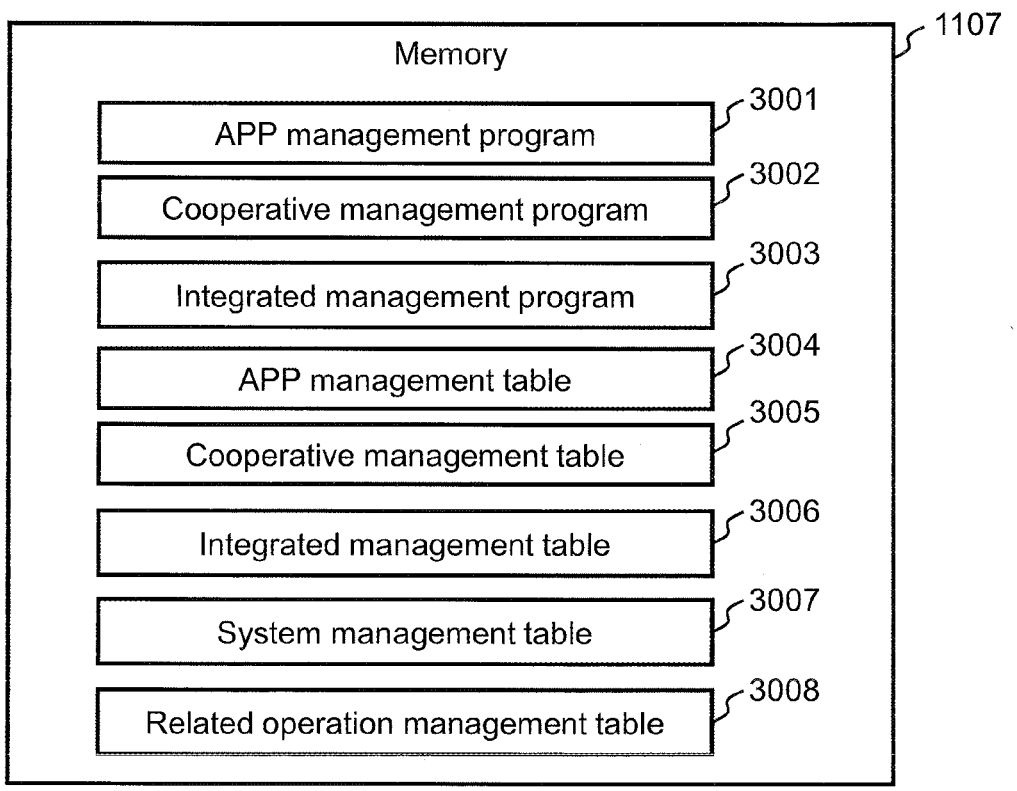
FIG. 3 shows programs and tables stored in a memory of a management computer.

FIG. 3 shows programs and tables stored in the memory 1107 of the management computer 1100.

The memory 1107 stores an APP management program 3001 that implements the operation management of the APP 2001 running on the computer 1000, a cooperative management program 3002 that converts an APP operation request into a common operation request, and the integrated management program 3003 that is a program for integrally managing a plurality of APP environments and converts the common operation request into a platform operation request. Here, "APP operation request" is a request for an operation instructed by the manger to the APP management program 3001, and is issued by the APP management program 3001. The APP operation request, issued by the APP management program 3001 in the first APP environment, may not necessarily be interpretable by the APP management program 3001 in the second APP environment. Here, "common operation request" is an operation request interpretable by the integrated management program 3003. Here, "platform operation request" is an operation request to a platform. In the present embodiment, at least one of the computer 1000 and the storage apparatus 1400 is a possible destination of the platform operation request. However, the platform is not limited to these. Apparatuses of the same type as the platforms might differ in a vender or a model. The memory 1107 stores an APP management table 3004 including information required for the operation management for the APP 2001, a cooperative management table 3005 indicating a relationship between the APP operation request and the common operation request, an integrated management table 3006 indicating the relationship between the common operation request and the platform operation request, a system management table 3007 indicating the relationship among the system, the computer, and the APP, and a related operation table 3008 indicating the relationship between an operation and a related operation ("related operation" is described later). The programs and the tables may be read from the HDD 1106 onto the memory 1007 by the CPU 1102, when the management computer 1100 is booted, for example. The tables 3004 to 3006 may be stored in a single management computer 1100, or may be distributed among a plurality of management computers 1100 to be stored. For example, when a first management computer executes the APP management program 3001 and the cooperative management program 3002, and a second management computer executes the integrated management program 3003, the first management computer may store the tables 3004 and 3005 and the second management computer may store the table 3006.

Figure 4:
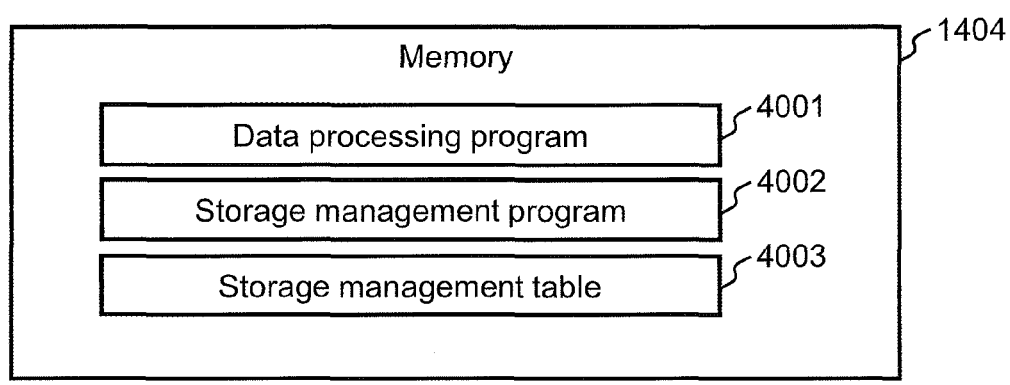
FIG. 4 shows programs and a table stored in a memory of a storage apparatus.

FIG. 4 shows programs and a table stored in the memory 1404 of the storage apparatus 1400.

The memory 1404 stores a data processing program 4001 that processes an access request from the computer 1000, a storage management program 4002 that manages information related to the structure and the performance of the storage apparatus 1400, and a storage management table 4003 including information related to the structure of the storage apparatus 1400. The programs and the tables may be read from the SSD 1405 and the HDD 1407 onto the memory 1404 by the controller 1403, when the storage apparatus 1400 is booted, for example. The access request is a write or read request for a designated LU. The input-output data is input to and output from the LU in accordance with the access request.

Figure 5:
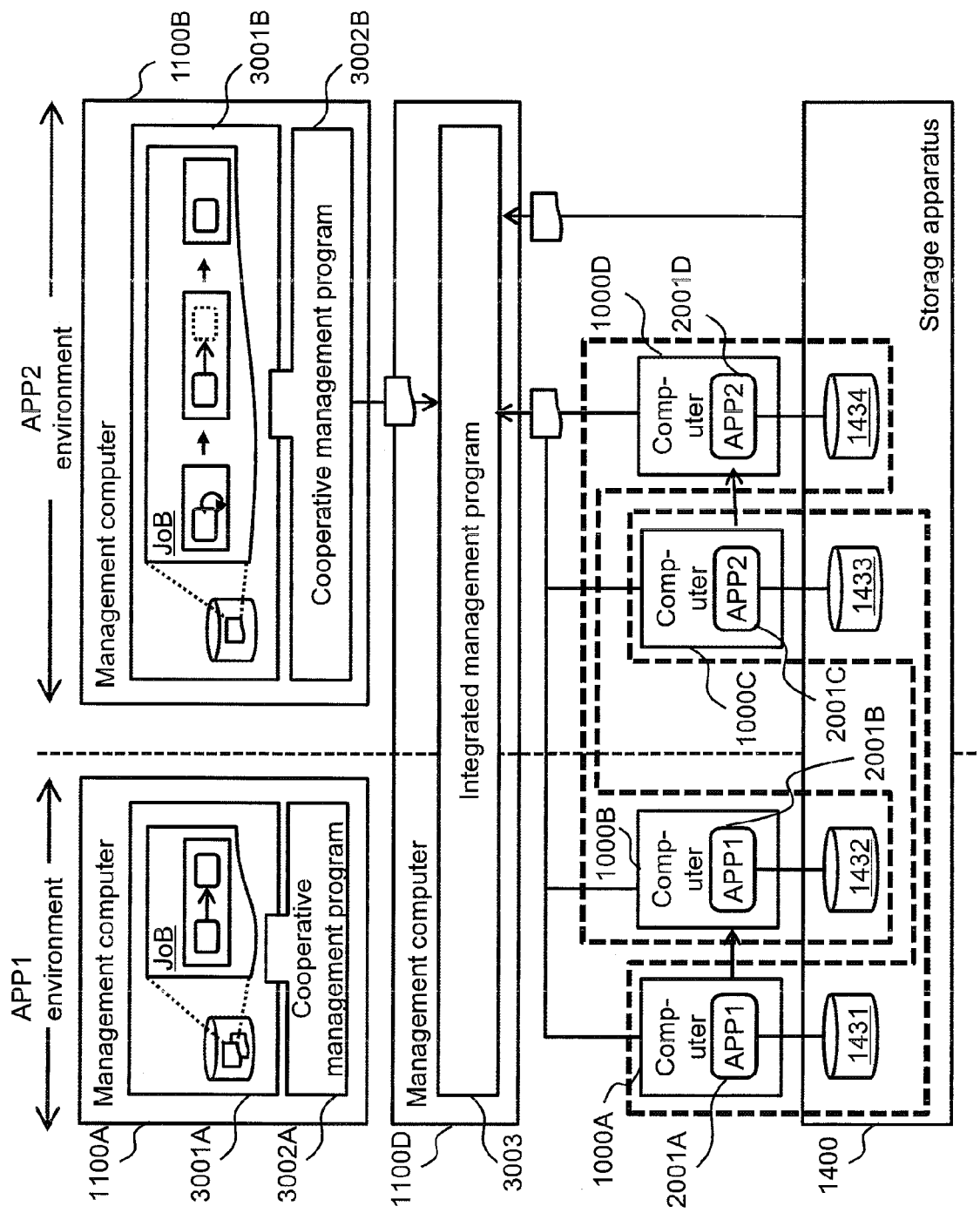
FIG. 5 shows an overview of an operation according to an aspect of the embodiment.
Figure 18:
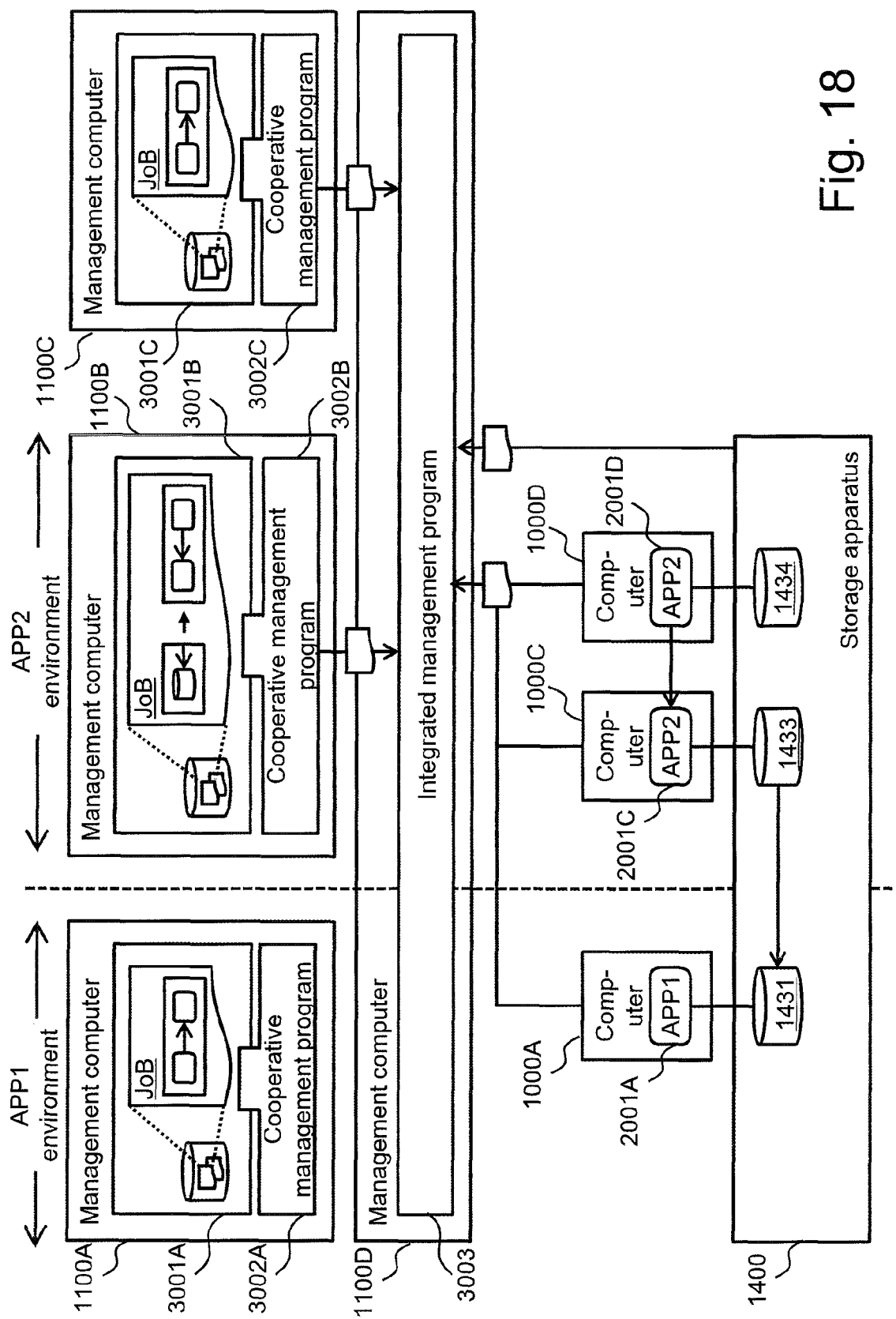
FIG. 18 shows an overview of an operation according to another aspect of the embodiment.

FIG. 5 shows an overview of an operation according to an aspect of the embodiment. FIG. 18 shows an overview of an operation according to another aspect of the embodiment.

FIGS. 5 and 18 each show an example of a use case for implementing the integrated management in an APP environment. In each of the figures, in addition to the management computers 1100A and 1100B (and 1100C) including the APP management program 3001 and the cooperative management program 3002 plugged into the APP management program 3001, the independent management computer 1100D not including the programs 3001 and 3002 exists. The management computer 1100D is coupled to the management computers 1100A and 1100B (and 1100C), and includes the integrated management program 3003. The management computers 1100A and 1100B (1100C) may not include the integrated management program 3003. Any one of the management computers 1100A and 1100B (1100C) may have the functions of the management computer 1100D, and thus the management computer 1100D may not be provided.

The description is given below with FIG. 5 as an example.

Two environments of an APP1 environment and an APP2 environment exist. The APP1 runs on the APP1 environment, and the APP2 runs on the APP2 environment. The APP1 2001A runs on the computer 1000A, and the APP2 2001C runs on the computer 1000C. After the cloning operation described later, an APP1 2001B as a clone of the APP1 2001A runs on the computer 1000B, and an APP2 2001D as a clone of the APP2 2001C runs on the computer 1000D.

A description is given with the APP1 environment as an example. In the APP1 environment, the management computer 1100A (APP management program 3001A) executes the operation management operation such as booting, stopping or cloning of the APP1 2001A (and 2001B). The operation management operation executed by the management computer 1100A needs to be executed not only as the operation for the APP1 2001A (and 2001B) but also as the operation for the platform such as the computer 1000A and the storage apparatus 1400. Thus, in the APP1 environment, the cooperative management program 3002A is plugged into the APP management program 3001A. The cooperative management program 3002A converts the APP operation request from the APP management program 3001A into the common operation request for operating the platform such as the computer 1000A (and 1000B) and the storage apparatus 1400. The cooperative management program 3002A transmits the common operation request to the integrated management program 3003 running on the management computer 1100D.

The integrated management program 3003 receives the common operation request not only in the APP1 environment, but may also receive the common operation request from the cooperative management program 3002B in the APP2 environment. Specifically, the cooperative management programs 3002A and 3002B each convert an operation request (APP operation request) unique to corresponding one of the APP environments into the common operation request, and transmits the common operation request to the integrated management program 3003. In the present embodiment, the common operation request is a request common to platforms, and indicates an operating intention for the platforms. The integrated management program 3003 converts the common operation request into the platform operation request interpretable by the platform as the operation target, and transmits the platform operation request to the platform as the operation target.

The integrated management program 3003 acquires the APP table 2003 and a computer management table 2004 from the computer 1000 and acquires the storage management table 4003 from the storage apparatus 1400, as every time the common operation request is received or periodically.

Based on the acquired tables 2003, 2004, and 4003, the integrated management program 3003 specifies the same system APP of the determination target APP, and generates or updates the system management table 3007, every time the common operation request is received or periodically. Thus, the APP2 2001C related to the APP1 2001A is specified as the same system APP of the APP1 2001A, and the information indicating that the APP1 2001A and the APP2 2001C are in the same system is registered in the system management table 3007. The range defined by a dotted line in FIG. 5 is the same system in FIG. 5.

Based on the tables 3004 to 3006, the integrated management program 3003 specifies the related operation of the target operation, every time the common operation request is received or periodically. Here, "target operation" is an operation for the determination target, and is an operation indicated by the received common operation request, for example. Here, "related operation" is an operation related to the target operation. Specifically, the related operation is, for example, an operation that is different from the target operation in the operation target platform, but has the same request content of at least one of the APP operation request, the common operation request, and the platform operation request (for example, at least one of REQUEST 8005, REQUEST_T 9005, and OPERATE 10004 described later). For example, the operation for the APP 2001 varies and may be "copy test system from an actual environment for testing" and "clone virtual environment". The operation for the storage apparatus 1400 is a clone (copy) operation such as "Local Copy" (copying executed between LUs in the storage apparatus 1400). Thus, which one of the computer 1000, the virtual computer, and the LU is cloned, whether the operation is a simple backup of data, or the like cannot be determined. Still, the intention such as "clone" and "backup" of the platform operation is defined in the common operation request (see FIG. 10). Thus, whether the platform operations from the different APP environments (platform operation intended by the common operation request) have the same intention can be determined. All things considered, the integrated management program 3003 can execute the platform operation not only for the determination target APP, but also for the same system APP.

One specific example is described by referring to FIG. 5.

The APP1 2001A is running on the computer 1000A, and the APP2 2001C running on the computer 1000C. The APP management program 3001A manages, as one job, a job including only a job element that is a clone operation for the APP1. The APP management program 3001B manages, as one job, a job including a job element that is an operation of generating a certain type of object, a job element that is a clone operation for the APP2, and a job element that is an operation of booting the APP2 generated as a clone.

The APP management program 3001A receives the clone operation request for the APP1 from the manager, and issues the APP operation request for cloning the APP1 2001A. The cooperative management program 3002A receives the APP operation request, converts the APP operation request into the common operation request based on the cooperative management table 3005 of the management computer 1100A, and transmits the common operation request to the integrated management program 3003.

The integrated management program 3003 receives the common operation request, and specifies that the APP2 2001C is the same system APP of the target APP1 2001A, from the system management table 3007. Furthermore, the integrated management program 3003 specifies that the cloning of the LU1431 used by the APP1 2001A, cloning of the APP2 2001C, and cloning of the LU 1433 used by the APP2 2001C are the related operations of the operation (cloning of APP1 2001A) indicated by the common operation request, from the related operation management table 3008. The integrated management program 3003 transmits the platform request for cloning the APP1 2001A and transmits the platform request for cloning the LU 1431 used by the APP1 2001A, as the cloning operation for the target APP1 2001A. The integrated management program 3003 transmits the platform request for cloning the APP2 2001C and transmits the platform request for cloning the LU 1433 used by the APP2 2001C, as the cloning operation for the APP2 2001C. Thus, as indicated by the dashed line in FIG. 5, a system including the APP1 2001B as a clone of the APP1 2001A and the APP2 2001D as a clone of the APP2 2001C is constructed as a clone of the system including the App1 2001A and the APP 2001C.

A specific example of the cloning operation for the target APP1 2001A is as follows. Specifically, the integrated management program 3003 transmits the platform operation request for generating the clone of the LU 1431 of the APP1 2001A, to the storage apparatus 1400. Thus, the LU 1432 as the clone of the LU 1431 is generated. The integrated management program 3003 transmits the platform operation request for generating the clone of the APP1 2001A, to at least one of the computers 1000A and 1000B. Thus, the APP1 2001B as the clone of the APP1 2001A is generated in the computer 1000B. More specifically, for example, the image of the APP1 stored in the LU 1431 is copied from the LU 1431 to the LU 1432, by the platform operation request to the storage apparatus 1400. The image of the APP1 is read from the LU 1432 onto the computer 1000B by the platform operation request to at least one of the computers 1000A and 1000B. Then, the APP management program 3001A configures the APP1 read onto the computer 10005, through the cooperative management program 3002A and the integrated management program 3003. Thus, the APP1 2001B can run on the computer 1000B. The APP operation requests issued from the APP management program 3001 may be partly transmitted to the platform (apparatus) as the operation target, with the cooperative management program 3002 and the integrated management program 3003 bypassed. The common operation requests transmitted from the cooperative management program 3002 may be partly transmitted to the platform (apparatus) as the operation target, with the integrated management program 3003 bypassed. The integrated management program 3003 may receive the APP control request issued from the APP management program 3001 with the cooperative management program 3002 bypass, and transmit the platform operation request according to the APP operation request to the platform. The cooperative management program 3002 may convert the APP operation request from the APP management program 3001 into the platform operation request, and transmit the platform operation request to the platform with the integrated management program 3003 bypassed. All things considered, any one of the cooperative management program 3002 and the integrated management program 3003 may be not be provided.

A specific example of the cloning operation for the APP2 2001C is as follows. Specifically, the integrated management program 3003 calls a predetermined function of the cooperative management program 3002B. Thus, the integrated management program 3003 receives the common operation request, which is the same as the common operation request received from the cooperative management program 3002A, from the cooperative management program 3002B of the APP management program 3001B that manages the APP2. Alternatively, the integrated management program 3003 displays a screen for receiving the cloning request for the APP2 2001C, on the management computer 1100B. Thus, the integrated management program 3003 receives the common operation request, which is the same as the common operation request received from the cooperative management program 3002A, from the cooperative management program 3002B. The integrated management program 3003 transmits the platform operation request for generating the clone of the LU 1433 of the APP2 2001C to the storage apparatus 1400, after performing the call or the image display, or without performing the call or the image display. Thus, the LU 1434 as a clone of the LU 1433 is generated. The integrated management program 3003 transmits the platform operation request for generating the clone of the APP2 2001C to at least one of the computers 1000C and 1000D. Thus, the APP2 2001D as the clone of the APP2 2001C is generated in the computer 1000D. More specifically, for example, the image of the APP2 stored in the LU 1433 is copied from the LU 1433 to the LU 1434, by the platform operation request to the storage apparatus 1400. The image of the APP2 is read from the LU 1434 onto the computer 1000D, by the platform operation to at least one of the computers 1000C and 1000D. Then, the APP management program 3001B configures the APP2 read onto the computer 1000D, through the cooperative management program 3002B and the integrated management program 3003. Thus, the APP2 2001D can run on the computer 1000D.

At least one of the same system APP and the related operation may be specified based on the information from the management computer 1100 in the APP environment and/or the information from a management computer outside the APP environment. For example, as shown in FIG. 18, the integrated management program 3003 may specify at least one of the APP in the same system as the APP and the related operation based on the information from the management computer 1100C (management program 3001C) which is not in any of the APP environments. Specifically, for example, the management computer 1100C may be the management computer of the storage apparatus 1400. The management computer 1100C (management program 3001C) manages a first definition for copying data from the APP2 2001D of the computer 1000D to the APP2 2001C of the computer 1000C, and a second definition for copying data from LU 1433 used by the APP2 2001C to the LU 1431 used by the APP1 2001A. The definitions are transmitted to the integrated management program 3003. The integrated management program 3003 can specify that the APP1 is in the same system as the APP2, from the second definition. The management computer 1100B (management program 3001B) manages the first definition (definition of data copy between APP2s), and may not manage the second definition.

In FIGS. 5 and 18, the integrated management program 3003 runs on the management computer 1100D common to the APP1 and the APP2 environments. Alternatively, the integrated management program 3003 may run on the management computers 1100A and 1100B. A plurality of different APP 2001s managed in different APP environments may run on the same computer. In other words, a plurality of APP 2001s executed in a single computer may be managed by different APP management programs 3001 in a plurality of different APP environments. A plurality of storage apparatuses 1400 may exist, and the LUs 1431 to 1434 may be distributed among a plurality of different storage apparatuses 1400.

Now, the structures of the tables in the embodiment and the process executed in the embodiment will be described below.

FIG. 6 shows the structure of the APP table 2003. In the tables shown in FIGS. 6 to 12, the names, the numbers, or the identifiers of components correspond to the name or the reference numerals of the components.

The APP table 2003 includes a record for each computer 1000. Each record includes COMPUTER 6001 as an identifier of the computer 1000, IP_ADDRESS 6002 as an IP address of the computer 1000, APPLICATION 6004 indicating the name of the APP 2001 running on the computer 1000, and VOL 6004 as an identifier of the logical volume used by the APP 2001 of the computer 1000. In the present embodiment, the logical volume is a storage area recognized by the computer 1000. One or more LUs are mounted on (associated with) the storage area. The record in the first line in FIG. 6 indicates that the IP address of the computer 1000A is "192.168.1.101", the computer 1000A executes the APP1, and a logical volume "1006A" is recognized by the APP1. Each computer 1000 may only have the record corresponding to the computer 1000. The management computer 1000 (1000D, for example) may include the table in FIG. 6 as a result of gathering information from a plurality of computers 1000A to 1000D.

FIG. 7 shows the structure of the computer management table 2004.

The computer management table 2004 includes a record for each computer 1000. Each record includes COMPUTER 70001 as an identifier of the computer 1000, VOL 7002 as an identifier of the logical volume used by the computer 1000, TARGET 7003 as an identifier (WWN (World Wide Name), for example) of a connection destination I/F of the logical volume used by the computer 1000, and LU 7004 as an identifier of the connection destination LU of the logical volume. The record in the first line in FIG. 7 indicates that the connection destination of a logical volume "606A" recognized by the computer 1000A is the FC I/F 1401 allocated with the identifier "1401", and the logical volume "606A" is coupled to the LU "1431".

Figure 8:
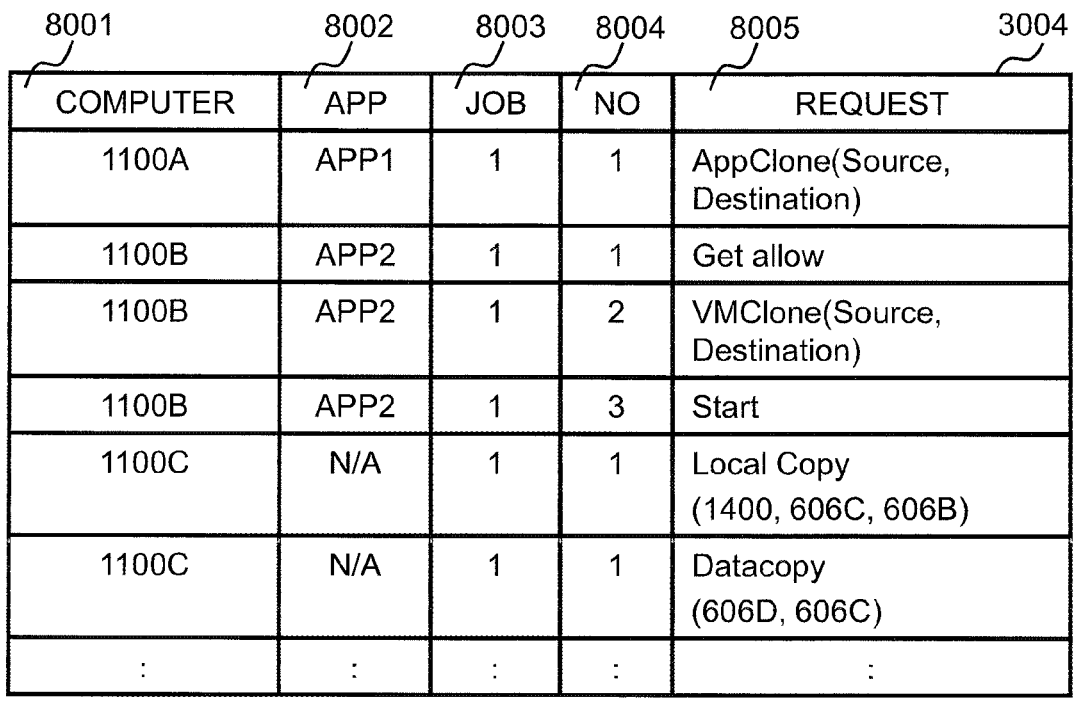
FIG. 8 shows the structure of an APP management table.

FIG. 8 shows the structure of the APP management table 3004.

The APP management table 3004 indicates the relationship among a computer, an APP, a job element, and an APP operation request. The APP management table 3004 includes a record for each job element. Each record includes COMPUTER 8001 as an identifier of the computer 1000, APP 8002 as the name of the APP 2001 as the management target, JOB 8003 as an identifier of a job to be executed, NO 8004 as the number of the job element (execution order of the requests to the job), and REQUEST 8005 as a statement included in the APP operation request. The record in the first line in FIG. 8 indicates that, for the APP1 in the computer 1100A, the APP management program 3001A of the APP1 transmits an APP operation request "AppClone" to execute the first job element in the job "1". Here, "job" may be sequential processes including one or more requests, and "job element" may be an individual operation such as generating data and cloning an APP.

Figure 9:
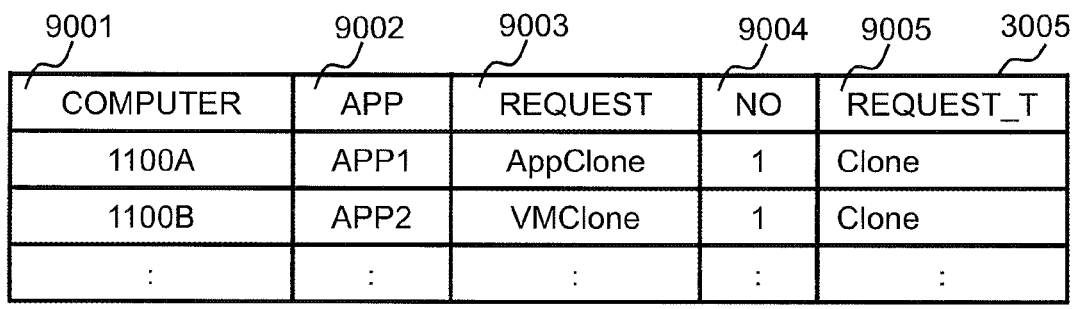
FIG. 9 shows the structure of a cooperative management table.

FIG. 9 shows the structure of the cooperative management table 3005.

As described above, the cooperative management table 3005 indicates the relationship between the APP operation request and the cooperative operation request. The cooperative management table 3005 includes a record for each APP operation request. Each record includes COMPUTER 9001 as an identifier of the computer 1000, APP 9002 as the name of the APP 2001 as the management target, REQUEST 9003 as a statement included in the APP operation request to be executed, NO 9004 as an execution order of the processes corresponding to the APP operation request, and REQUEST_T 9005 as a statement included in the common operation request. The record in the first line in FIG. 9 indicates that the first common operation request "Clone" corresponds to the APP operation request "AppClone".

FIG. 10 shows the structure of the integrated management table 3006.

As described above, the integrated management table 3006 indicates the relationship between the common operation request and the platform operation request. The integrated management table 3006 includes a record for each common operation request. Each record includes COMPUTER 10001 as an identifier of a computer that receives the common operation request, REQUEST_T 10002 as a statement included in the common operation request, NO 10003 as the execution order of the processes for the common operation request, and OPERATE 10004 as a statement included in the platform operation request. The record in the first line of FIG. 10 indicates that the management computer 1100D receives the first common operation request "Clone", and the platform operation request "Create machine" corresponds to the first common operation request "Clone". The record in the second line in FIG. 10 indicates that the management computer 1100D receives the second common operation request "Clone", and the platform operation request "Local Copy" corresponds to the second common operation request "Clone". The records in the first and the second lines indicate that the first common operation request "Clone" is converted into the platform operation request for cloning a platform such as a virtual computer (or a computer) and an LU. Then, the second common operation request "Clone" is converted into a platform operation request for copying an APP or data from a clone source (a virtual computer (or a computer) and an LU) to a clone destination (a virtual computer (or a computer) and an LU) generated in response to the first platform operation request. As described above, the same common operation requests "Clone" have the corresponding platform operation requests distinguished from each other in accordance with the order in which processes for the common operation request are executed.

FIG. 11 shows the structure of the system management table 3007.

The system management table 3007 includes a record for each system including a plurality of APPs 2001. Each record includes SYSTEM 11001 as an identifier of the system, COMPUTER 11002 as an identifier of the computer 1000 including the APP 2001 in the system, and APPLICATION 11003 as an identifier of the APP 2001 included in the system. The records in the first and the second lines in FIG. 11 indicate that a system "100" includes the APP1 2001A of the computer 1000A and the APP2 2001C of the computer 1000C.

FIG. 12 shows the structure of the storage management tale 4003.

The storage management table 4003 includes a record for each LU. Each record includes STORAGE 12001 as an identifier of a storage apparatus, LU 12002 as an identifier of an LU, SIZE 12003 as a capacity of the LU, and IF 12004 as an identifier of an FC I/F associated with the LU. The record in the first line in FIG. 12 indicates that the capacity of the LU 1431 is 100 GB, and the LU 1431 is associated with the FC I/F 1401.

Some processes executed in the present embodiment will be described below.

Figure 13:
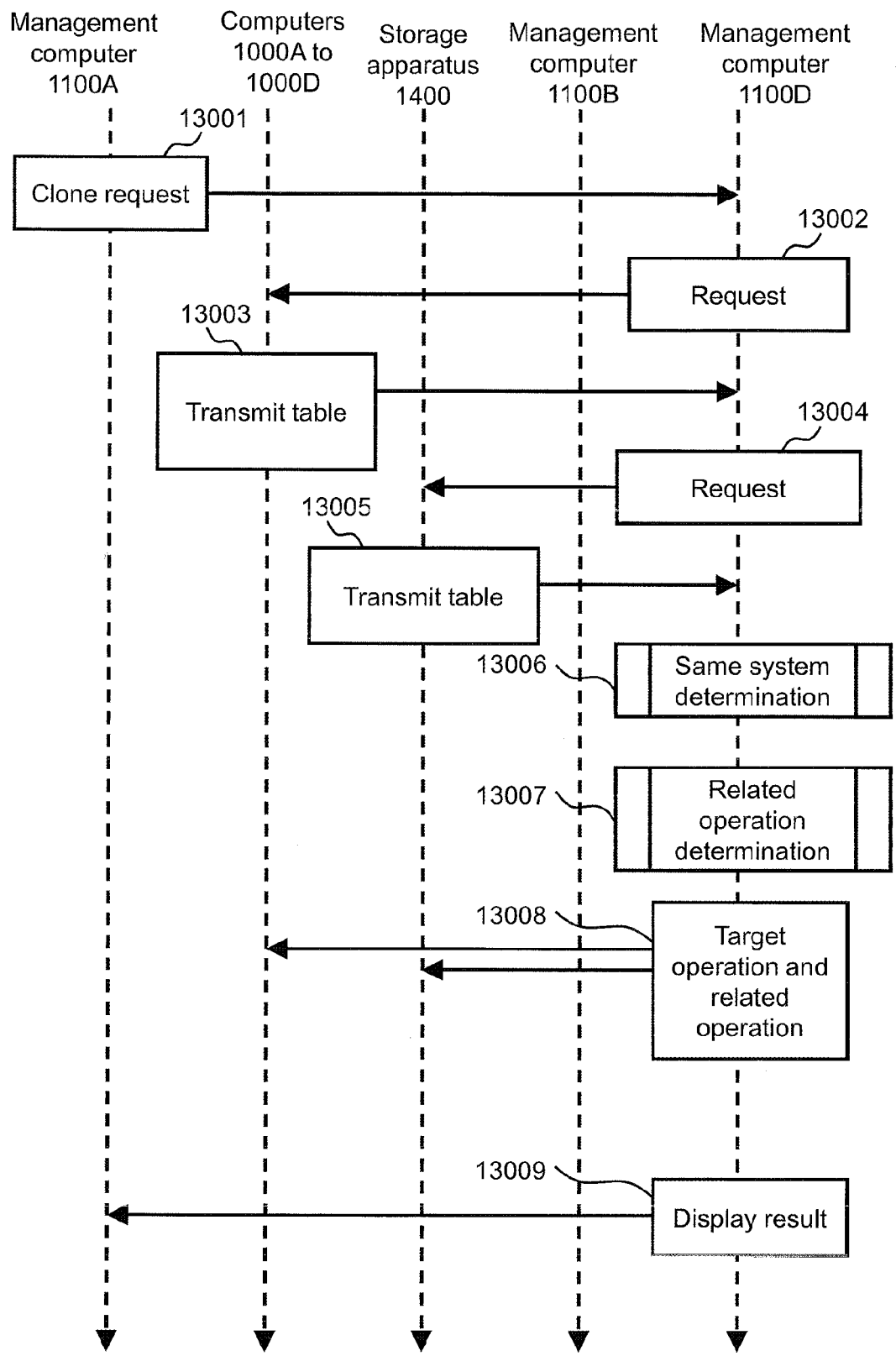
FIG. 13 shows a process flow of a performance management.

FIG. 13 shows a process flow of a performance management. To facilitate the understanding of the description of FIG. 13, the case of FIG. 5 is used as an example as appropriate, and a case where the manager instructs the APP management program 3001A to clone the APP1 in the APP1 environment is exemplarily described. Thus, the APP2 is related to the APP1, and the clones of the APP2 and the LU of the APP2 need to be generated in addition to the clones of the APP1 and the LU of the APP1, for cloning the APP1.

The APP management program 3001A of the management computer 1100A receives the operation request to clone the APP1 from the manager, and issues the clone request for the APP1 as the APP operation request. The cooperative management program 3002A receives the clone request for the APP1. Based on the cooperative management table 3005, the cooperative management program 3002A converts the clone request for the APP1 into the common operation request corresponding to the clone request for the APP1, and transmits the common operation request to the management computer 1100D that executes the integrated management program 3003 (step 13001).

The integrated management program 3003 of the management computer 1100D transmits a table transmission request to the computers 1000A to 1000D as the management targets (step 13002). The table transmission request may be a platform operation request corresponding to the OS of the computer 1000 as a transmission destination, and the like. The computer management programs 2002 of the respective computers 1000A to 1000D receive the table transmission request, and transmit the APP management table 2003 and the computer management table 2004 (information in the tables) to the management computer 1100D (step 13003). The IP address of the computer 1000 as the management target may be stored in the memory 1107 of the management computer 1100D in advance, and the table transmission request may be transmitted in step 13002 by using the IP address.

The integrated management program 3003 of the management computer 1100D transmits the table transmission request to the storage apparatus 1400 as the management target (step 13004). The storage management program 4002 of the storage apparatus 1400 receives the table transmission request, and transmits the storage management table 4003 (information in the table) to the management computer 1100D (step 13005). The IP address of the storage apparatus 1400 as the management target may be registered in the memory 1107 of the management computer 1100D in advance, and the table transmission request may be transmitted in step 13004 by using the IP address.

The integrated management program 3003 of the management computer 1100D executes the same system determination process (step 13006), and executes the related operation determination process (step 13007). Through the same system determination process, the APP included in the same system as the target APP is specified, whereby the system management table 3007 is completed. Through the related operation determination process, the related operation of the operation is specified, whereby the related operation management table 3008 is completed. For the determination of the related operation, at least one of a determination on whether the OPERATE 10004 in the integrated management table 3006 read by the integrated management program 3003 is the same, a determination on whether REQUEST_T 9005 in the cooperative management table 3005 read by the cooperation management program 3002 is the same, and a determination on whether REQUEST 8005 in the APP management table 3004 read by the APP management program 3001 is the same, is made. If a result obtained by at least one determination is true, the operation with the result is determined as the related operation.

The integrated management program 3003 executes the target operation corresponding to the received common operation request and the related operation of the target operation for the operation target APP and the same system APP of the operation target APP, based on the integrated management table 3006, the system management table 3008, and the related operation management table 3008 (step 13008). In the example shown in FIG. 5, the integrated management program 3003 executes the cloning operation for the APP1 2001A and the LU 1431. Specifically, the integrated management program 3003 transmits the platform operation request for cloning the LU 1431, to the storage apparatus 1400. The integrated management program 3003 transmits the platform operation request for cloning the APP1 2001A to at least one of the computer 1000A and the computer 1000B as the cloning destination. Thus, the LU 1432 as the clone of the LU 1431, and the APP1 2001B as the clone of the APP1 2001A that uses the LU 1432 are generated. The integrated management program 3003 executes the cloning operation for the APP2 2001C and the LU 1433. Specifically, the integrated management program 3003 transmits the platform operation request for cloning the LU 1433, to the storage apparatus 1400. The integrated management program 3003 transmits the platform operation request for cloning the APP2 2001C to at least one of the computer 1000C and the computer 1000D as the cloning destination. Thus, the LU 1434 as the clone of the LU 1433 is generated, and the APP2 2001D that is the clone of the APP2 2001C and uses the LU 1434 are generated. The platform operation requests are each a request specified from the integrated management table 3006 by using the common operation request transmitted in step 13001.

The integrated management program 3003 displays a screen showing the result of the process executed in response to the common operation request transmitted in step 13001 (specifically, the result of sequential processes in steps 13006 to 13008), on the management computer 1100A (step 13009). The integrated management program 3003 may display the screen showing the result of the process executed in response to the common operation request transmitted in step 13001 also on the management computer (1100B in the example of FIG. 5) that manages the same system object.

In FIG. 13, steps 13002 to 13007 may not necessarily be executed after step 13001. Steps 13002 to 13007 may be skipped, so that step 13008 is executed after step 13001. Specifically, the system management table 3007 and the related operation management table 3008 may be constructed and updated not in synchronization with the reception of the common operation request (may be executed periodically, for example), instead of being constructed and updated every time the common operation request obtained by converting the APP operation request is received. Similarly, the management computer 1000D may request a table from the management target (computer or storage apparatus) periodically. Alternatively, each management target may transmit a table without receiving a request from the management computer 1100D. The table may be transmitted periodically or when the table is updated. When a common operation request is received, at least steps 13006 and 13007 may be executed only for the target APP of the common operation request.

Figure 14:
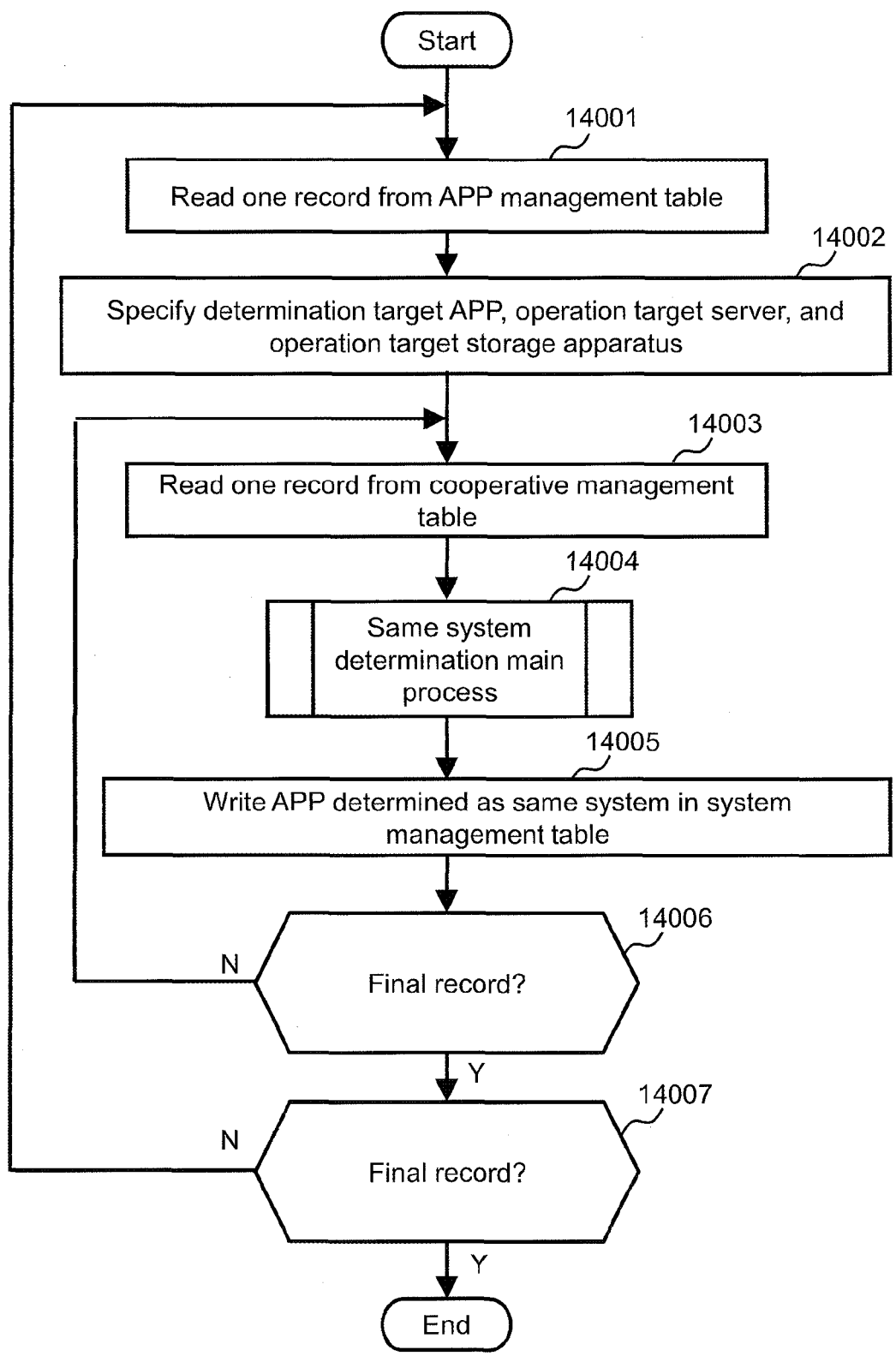
FIG. 14 shows a process flow of a same system determination process.

FIG. 14 shows a process flow of the same system determination process (step 13006 in FIG. 13).

The integrated management program 3003 reads the first record in a group of unread records in the APP management table 3004 (step 14001), and specifies the determination target APP, the operation target computer, and the storage apparatus from the record (step 14002). The determination target APP is the APP indicated by APP 8002. The operation target computer is a computer indicated by COMPUTER 6001 corresponding to the determination target APP (APPLICATION 6003), and is specified from the acquired APP table 2003. The operation target storage apparatus is a storage apparatus indicated by STORAGE 12001 corresponding to TARGET 7003 and LU 7004 corresponding to the operation target computer (COMPUTER 7001), and is specified from the acquired computer management table 2004 and the storage management table 4003.

The integrated management program 3003 reads the first record in the group of unread records in the cooperative management table 3005 (step 14003), and executes the same system determination main process (step 14004). The integrated management program 3003 writes in the system management table 3007, an identifier (AP 11003) of the APP determined to be in the same system in the same system determination main process, an identifier (COMPUTER 11002) of a computer including the APP, and SYSTEM 11001 as an identifier of the same system (step 14005).

The integrated management program 3003 determines whether the record read in step 14003 is the final record in the cooperative management table 3005 (step 14006). When the determination result is false (step 14006: N), step 14003 is executed. When the determination result is true (step 14006: Y), the integrated management program 3003 determines whether the record read in step 14001 is the final record in the APP management table 3004 (step 14007). When the determination result is false (step 14007: N), step 14001 is executed, and when the determination result is true, (step 14007: Y), the process is terminated.

Figure 15:
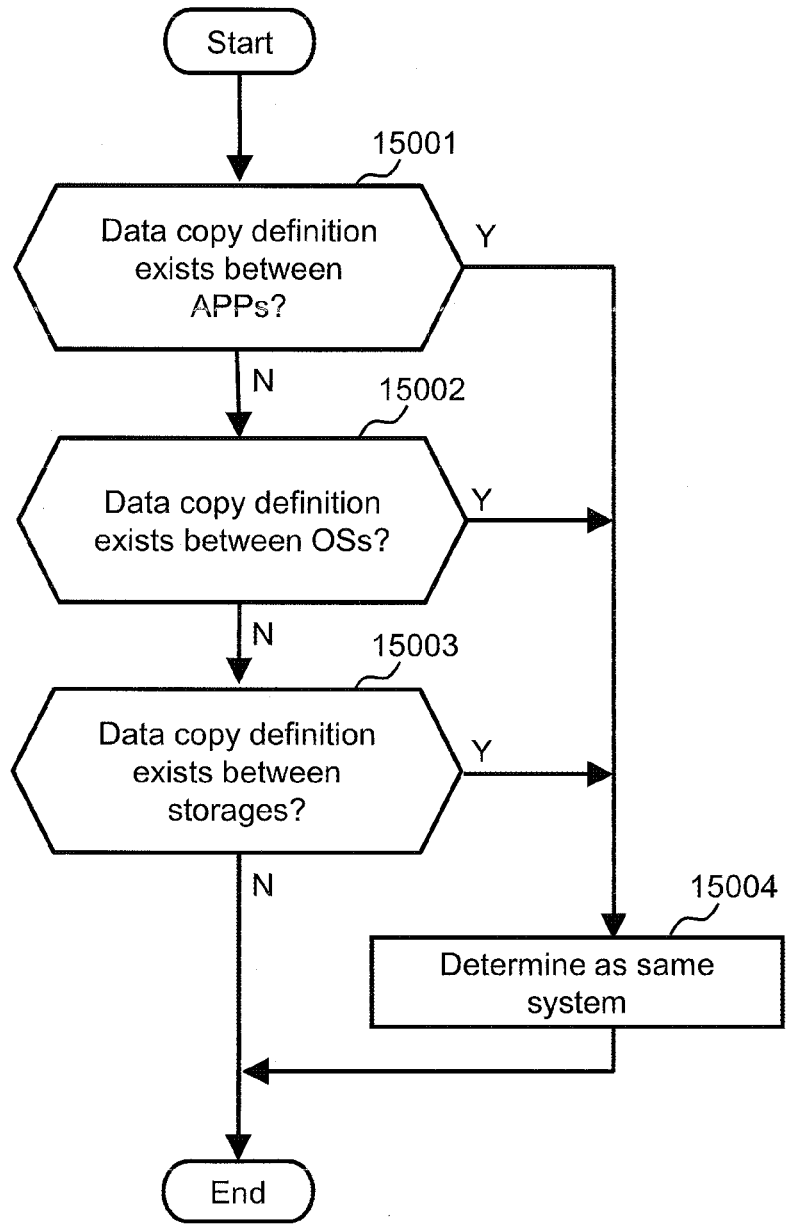
FIG. 15 shows a process flow of a same system determination main process.

FIG. 15 shows a process flow of the same system determination main process (step 14004 in FIG. 14). Steps 15001 to 15003 described below may be executed in any order.

The integrated management program 3003 determines whether the data copy definition exists between the determination target APP and another APP (step 15001). This may be a determination on whether the APP operation request (REQUEST 9003) corresponding to the determination target APP is "AppClone". When the determination result is true (step 15001: Y), the integrated management program 3003 determines that the APP (APP as Source or Destination specified from REQUEST 8005, for example) involved in the data copy with the determination target APP is in the same system as the APP as the determination target (step 15004). When the determination result is false (step 15001: N), step 15002 is executed.

The integrated management program 3003 determines whether the data copy definition exists between the OS in the computer including the determination target APP and the OS in another computer (step 15002). This may be a determination on whether the APP operation request (REQUEST 9003) corresponding to the determination target APP is "VMClone". When the determination result is true (step 15002: Y), the integrated management program 3003 determines that the APP in the computer including the OS (OS as Source or Destination specified from REQUEST 8005 for example) involved in the data copy with the OS in the computer including the determination target APP is in the same system as the APP as the determination target APP (step 15004). When the determination result is false (step 15002: N), step 15003 is executed.

The integrated management program 3003 determines whether the data copy definition exists between the LU used by the determination target APP and another LU (step 15003). This may be a determination on whether the APP operation request (REQUEST 9003) corresponding to the determination target APP is "Local Copy". When the determination result is true (step 15003: Y), the integrated management program 3003 determines that the APP that uses the LU (an identifier of an LU specified from REQUEST 8005 for example) involved in the data copy with the LU used by the determination target APP is in the same system as the APP as the determination target APP (step 15004). When the determination result is false (step 15003: N), the process is terminated.

Figure 16:
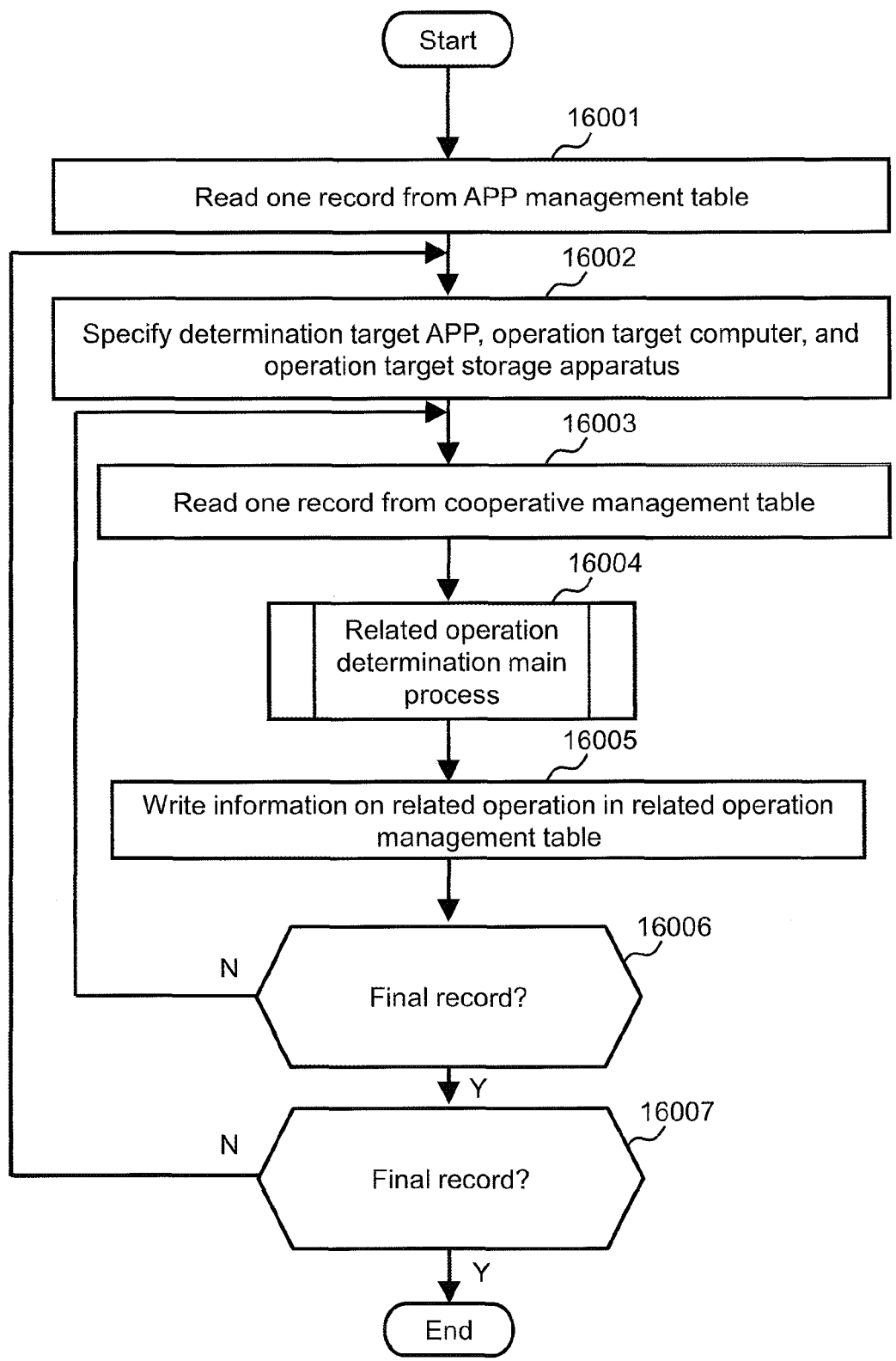
FIG. 16 shows a process flow of a related operation determination process.

FIG. 16 shows a process flow of the related operation determination process (step 13007 in FIG. 13).

Processes in steps 16001 to 16007 are similar to those in steps 14001 to 14007 in FIG. 14. The differences are that the related operation determination main process is executed (step 16004) instead of the same system determination main process in step 14004, and that the determination result is registered in related operation target table 3008 (step 16005) instead of the system management table 3007 (step 14005).

Figure 17:
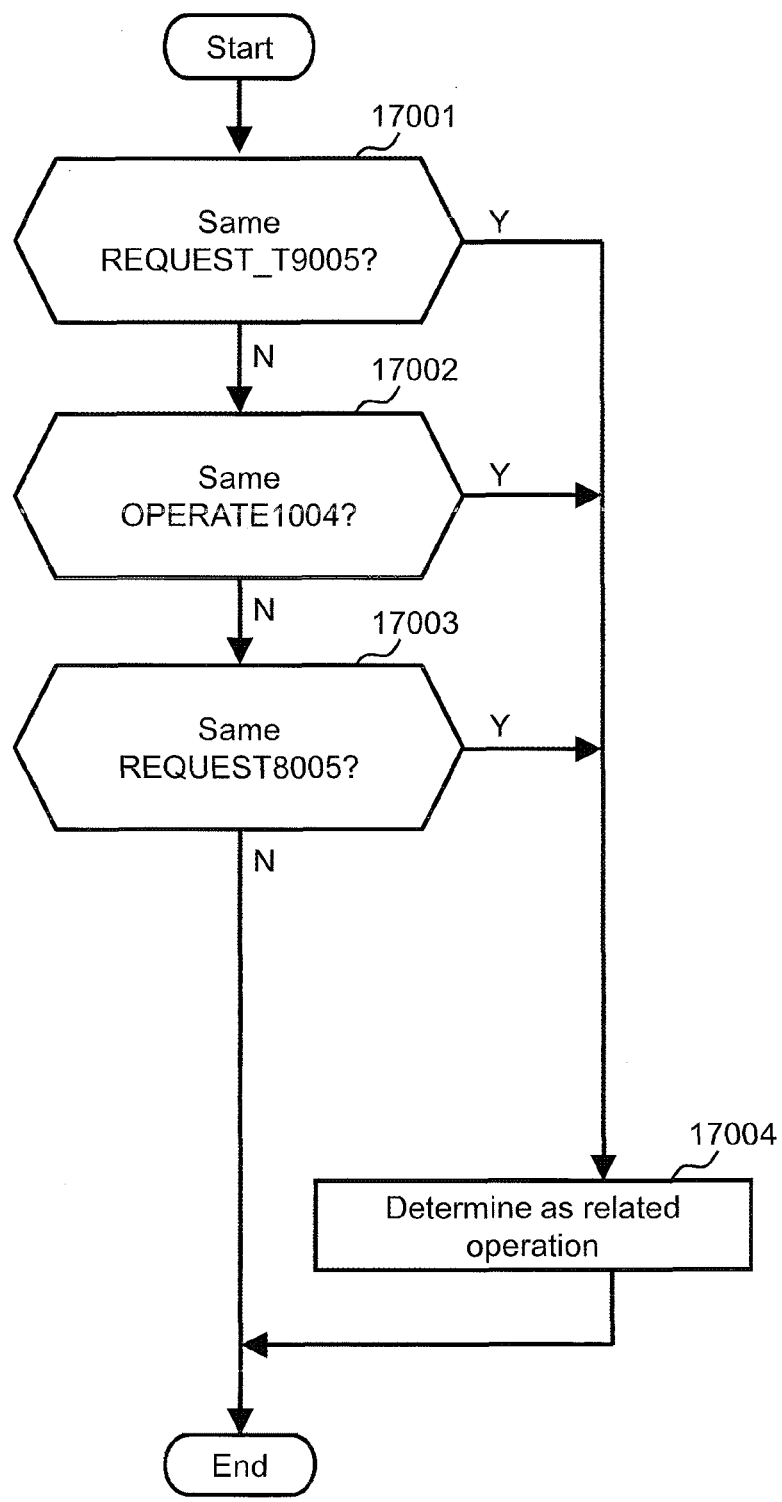
FIG. 17 shows a process flow of a related operation determination main process.

FIG. 17 shows a process flow of the related operation determination main process (step 16004 in FIG. 16). Steps 17001 to 17003 may be executed in any order.

The target operation herein is the operation corresponding to the record read from the cooperative management table 3005 in step 16003 in FIG. 16. The integrated management program 3003 determines whether the first record including REQUEST_T 9005 that is the same as REQUEST_T 9005 of the target operation, is in the cooperation management table 3005 (step 17001). When the determination result is true (step 17001: Y), the integrated management program 3003 determines that the operation corresponding to the first record is the related operation of the target operation (step 17004). When the determination result is false (step 17001: N), step 17002 is executed.

The integrated management program 3003 determines whether the second record including OPERATE 10004 that is the same as OPERATE 10004 corresponding to the platform operation request corresponding to the target operation, is in the integrated management table 3006 (step 17002). When the determination result is true (step 17002: Y), the integrated management program 3003 determines that the operation corresponding to the second record is the related operation of the target operation (step 17004). When the determination result is false (step 17002: N), step 17003 is executed.

The integrated management program 3003 determines whether the third record including REQUEST 8005 that is the same as REQUEST 8005 corresponding to the APP operation request corresponding to the target operation, is in the APP management table 3004 (step 17003). When the determination result is true (step 17003: Y), the integrated management program 3003 determines that the operation corresponding to the third record is the related operation of the target operation (step 17004). When the determination result is false (step 17003: N), the process is terminated.

As described above, examples of criteria of the determination for the related operation include the platform operation request, the common operation request, and the APP operation request. Here, the platform operation request indicates, for example, a storage operation (copy operation) such as "Local Copy", and thus all the copy operations such as clone and backup are determined as the same operation. Thus, the configuration for skipping the step of determining whether the platform operation request such as the storage operation is the same (step 17001), may be made. The APP operation request is a request defined for each APP, and thus might differ among the APP management programs in the definition. Thus, the configuration for skipping the step (step 17003) for determining whether the APP operation request is the same may be made. In the example of FIG. 17, an operation corresponding to a record having the same value as at least one of REQUEST 8005, REQUEST_T 9005, and OPERATE 10004 corresponding to the target operation, is determined as the related operation. Alternatively, an operation corresponding to a record having the same values as two predetermined ones of REQUEST 8005, REQUEST_T 9005, and OPERATE 10004 corresponding to the target operation, may be determined as the related operation. A set of information on the operation determined as the related operation and the information on the target operation is written in the related operation management table 3008 in step 16005 in FIG. 16. When the registered related operation is the APP operation request or the common operation request, such a related operation is converted into the platform operation request to be transmitted to the platform.

An embodiment was described above, but the present invention is not limited to the embodiment. It is a matter of course that the present invention can be modified in various ways without departing from the gist of the present invention.

For example, the integrated management program 3003 may not be provided. Here, each cooperative management program 3002 may serve as the integrated management program 3003. The cooperative management programs 3002 communicate with each other so that the information is shared, and thus the system management table 3007 may be generated by at least one cooperative management program 3002.

The transmitter, of the platform operation request to the platform such as the computer 1000 or the storage apparatus 1400, may be the cooperative management program 3002 instead of the integrated management program 3003.

The integrated management program 3003 periodically acquiring the tables from the computer 1000 and the storage apparatus 1400 may not necessarily generate the system management table 3007. For example, when receiving the common operation request for an APP, the integrated management program 3003 may determine an APP in the same system as the APP, based on the acquired table and at least one of the management tables 3004 to 3006.

REFERENCE SIGNS LIST

1000 Computer
1100 Management computer
1200 FC switch
1300 IP switch
1400 Storage apparatus

The invention claimed is:
1. A management system comprising:
a plurality of management computers; wherein each management computer from the plurality of management computers includes:
a memory,
a fiber channel interface,
an internet protocol interface, and
a processor communicatively coupled to the fiber channel, the internet protocol interface and the memory;
an integrated management computer communicatively coupled to teach of the plurality of management computers, wherein the integrated management computer manages a plurality of applications; and
a storage device communicatively coupled to each of the plurality of management computers and the integrated management computer;
wherein the integrated management computer:
receives a process request from a first computer, wherein the process request includes an indication of a first application program (APP) from the plurality of applications;
determines a second APP from the plurality of applications that is related to the first APP based on information stored in the storage device;
generates a first common process request, wherein the first common process request is based on conversion information stored in the storage device,
generates a second common process request, wherein the second process request, is executed by the second APP and is based on the process request and the conversion information stored in the storage device,
transmits the first common process request to the plurality of management computers; and
transmits the second common process request to the plurality of management computers;
wherein each particular management computer from the plurality of management computers:
receives the first common process request,
if the first common process request is determined to be associated with a plurality of application environments provided by the particular management computer:
converts the first common process request to a first platform request that can be executed by the particular management computer,
executes the first platform request, and transmits a first result of the first process request to the first computer;
receives the second common process request, and
if the second common process request is determined to be associated with the plurality of application environments provided by the particular computer:
converts the second common process request to a second platform request that can be executed by the particular management computer,
executes the second platform request, and
transmits a second result of the second platform request to the first computer.

2. The management system according to claim 1,
wherein the storage device is configured to store definition information indicating a definition related to data copy between APPs, and
wherein the second APP has a data copy relationship with the first APP, and is specified from the definition information.

3. The management system according to claim 1,
wherein the storage device is configured to store definition information indicating a definition related to data copy between storage areas in one or more storage apparatuses including a storage area used by the first APP and a storage area used by the second APP, and
wherein the second APP is an APP that uses a storage area in data copy relationship with a storage area used by the first APP, and is specified from the definition information.

4. The management system according to claim 3,
wherein the definition information is information acquired from a management computer which is not in any of different APP environments including the first APP and the second APP and is configured to manage the one or more storage apparatuses.

5. The management system according to claim 3,
wherein the definition information is information specified by first APP management information that indicates a relationship between the first APP and a storage area used by the first APP and is acquired by a computer that executes the first APP, second APP management information that indicates a relationship between the second APP and a storage area used by the second APP and is acquired by a computer that executes the second APP, and storage area management information that indicates a relationship between storage areas and is acquired from the one or more storage apparatuses.

6. The management system according to claim 1,
wherein the conversion information includes an association among an APP process request as a process request depending on an APP, a common process request as a common process request not depending on the APP, and a platform process request as a process request to a platform of the APP,
wherein the APP process request is a process request before converting the common process request, and the platform process request is a process request after converting the common process request.

7. The management system according to claim 1,
wherein the conversion information includes an association between an APP process request as a process request depending on an APP and a platform process request as a process request for a platform of the APP, and
wherein the APP process request is a process request before converting the platform process request, and the platform process request is a process request after converting the APP process request.

* * * * *